UNITED STATES PATENT OFFICE.

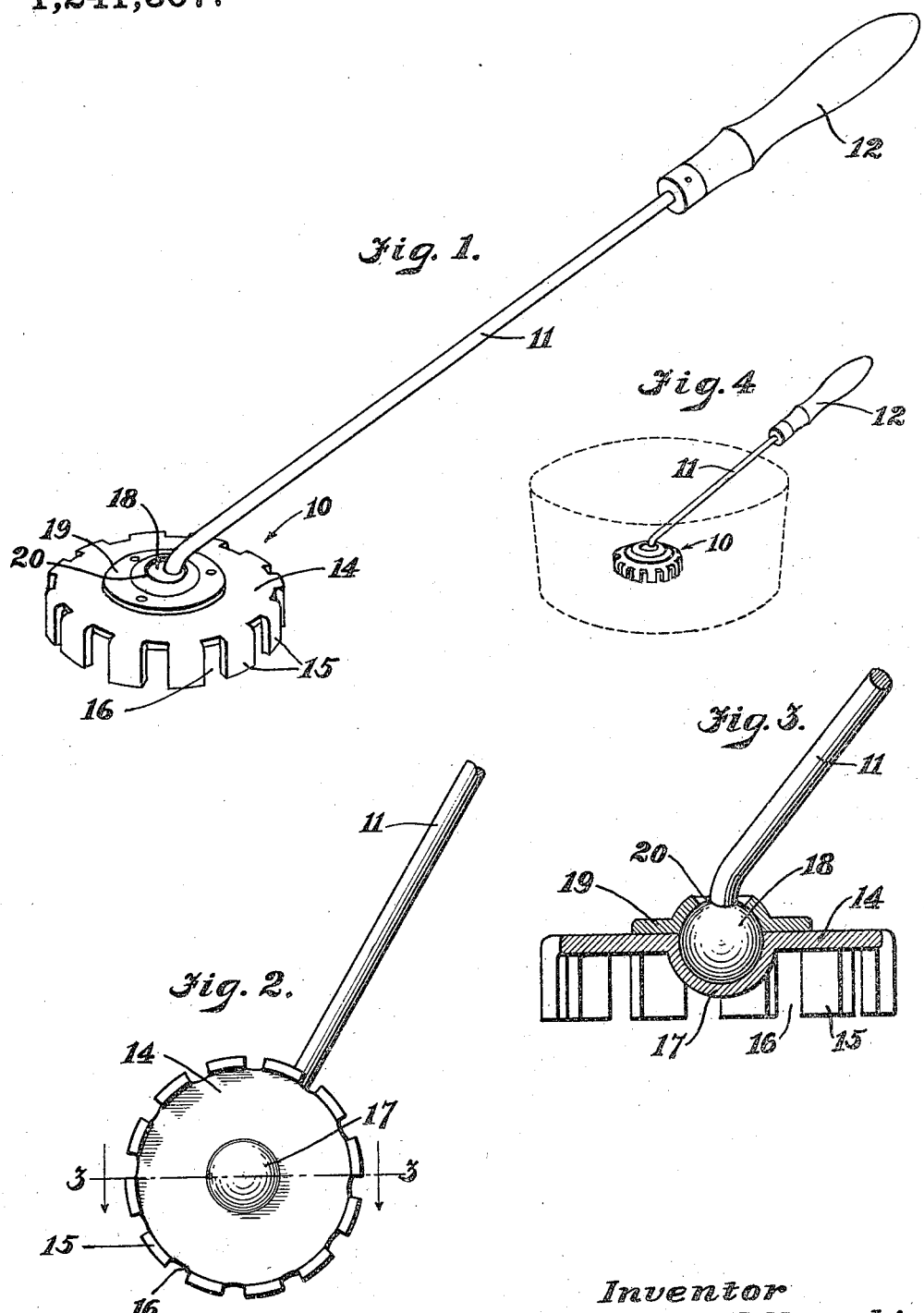

CHARLES B. TOMPKINS, OF LOS ANGELES, CALIFORNIA.

STIRRING IMPLEMENT.

1,241,307.　　　　Specification of Letters Patent.　　Patented Sept. 25, 1917.

Application filed December 14, 1916. Serial No. 136,946.

*To all whom it may concern:*

Be it known that I, CHARLES B. TOMPKINS, a citizen of the United States, residing at Los Angeles, in the county of Los Angeles and State of California, have invented new and useful Improvements in Stirring Implements, of which the following is a specification.

This invention relates to a stirring implement and particularly pertains to an implement for use in stirring foods and other materials being cooked.

It is an object of this invention to provide a stirring implement which is adaptable for use in stirring fruit while being preserved and which is so designed as to thoroughly agitate the material upon the bottom of the utensil so as to prevent it from sticking and becoming burned.

Another object of this invention is to provide a stirring implement which makes contact with a large area of the utensil surface and is so designed as to present various scraping edges disposed at angles to the direction of motion so that the surface of the utensil will be thoroughly cleaned.

Another object of this invention is to provide a stirring implement which is so constructed as to permit the stirring element to properly bear upon the surface of the utensil at all times irrespective of the angular position of the handle affixed thereto.

It is a further object of this invention to provide a stirring implement which is composed of few parts which may be readily made at small expense and are not liable to become broken.

Other objects will appear hereinafter.

The invention is illustrated, by way of example, in the accompanying drawings in which:

Figure 1 is a view in perspective illustrating the stirring implement.

Fig. 2 is a view in plan elevation particularly illustrating the stirring element and the arrangement of the scraping blades.

Fig. 3 is a view in transverse section as seen through the stirring element on the line 3—3 of Fig. 2 and discloses the universal mounting of the handle.

Fig. 4 is a small view in perspective illustrating the application of the implement to a utensil.

Referring more particularly to the drawings, 10 indicates a stirring unit which is mounted upon the end of a handle rod 11 adapted to be manipulated by means of a handle grip 12 secured at the upper end of the rod. The unit is here shown as formed with a circular body disk 14 which has a series of scraping blades 15 disposed around its periphery and extending downwardly therefrom and at right angles to the disk. It has been found desirable to form the blades and disk of a single piece of sheet metal and to bend the blades so that their scraping edges are in alinement with each other. The blades are formed with a space 16 between them so that they may more thoroughly perform their intended function. The center of the disk 14 is formed with an obtrusion 17 which provides a hemispherical cup for the reception of a handle ball 18. This ball is secured to the lower end of the handle rod and is held in place by means of a top flange 19 fixed over the upper portion of the ball and fastened to the disk. An enlarged clearance opening 20 is formed through the flange 19 and permits the desired movement of the handle rod. In order to more conveniently manipulate the stirring unit, the rod is formed with a bend adjacent the ball 18 for the purpose of normally inclining the handle relative to the vertical axis of the ball and socket and at a convenient angle of operation.

In using the implement, it is placed within a desired utensil and when the stirring unit is brought to bear upon the bottom of the utensil will conform to the surface thereof. As the unit is moved around over the surface of the utensil by means of the handle the stirring blades will scrape the surface of the utensil and at the same time will produce a stirring action to circulate the cooked material which has settled at the bottom of the utensil, thus performing the action of scraping the surface and preventing burning, and stirring the accumulated material to prevent its becoming fixed to the surface of the utensil.

It will thus be seen that the implement here provided is simple in its construction, may be readily and inexpensively manufactured, and will operate to thoroughly stir material within a utensil and prevent its accumulation upon the heated surface thereof.

While I have shown the preferred construction of my stirring implement as now known to me, it will be understood that various changes in the combination, construction, and arrangement of parts may be made by those skilled in the art without departing from the spirit of my invention.

I claim:

In a stirring implement, a disk, a handle, means forming a ball and socket connection between the handle and the center of the disk, said handle being bent to an incline relative to the vertical axis of the ball and socket joint, and blades extending from the periphery of the disk at right angles.

In testimony whereof I have signed my name to this specification.

CHARLES B. TOMPKINS.

Copies of this patent may be obtained for five cents each, by addressing the "Commissioner of Patents, Washington, D. C."